R. T. McGEE.
GLASS DELIVERY APPARATUS.
APPLICATION FILED MAY 22, 1919.

1,394,920.

Patented Oct. 25, 1921.

WITNESSES
W. B. Erskine
A. L. Dunlap

INVENTOR
Richard T. McGee
BY
A. E. Dunlap
ATTORNEY

UNITED STATES PATENT OFFICE.

RICHARD T. McGEE, OF WHEELING, WEST VIRGINIA.

GLASS-DELIVERY APPARATUS.

1,394,920. Specification of Letters Patent. Patented Oct. 25, 1921.

Application filed May 22, 1919. Serial No. 298,903.

*To all whom it may concern:*

Be it known that I, RICHARD T. McGEE, a citizen of the United States of America, and resident of Wheeling, county of Ohio, and State of West Virginia, have invented certain new and useful Improvements in Glass-Delivery Apparatus, of which the following is a specification.

This invention relates broadly to glass working apparatus, and it has for its primary object to provide an apparatus whereby glass may be directly delivered from a glass melting tank to a glass-shaping mold without exposing the same to the atmosphere and without the usual manual handling.

A further object is to simplify and structurally improve that type of glass delivery apparatus disclosed in my application for Letters Patent filed July 26, 1918, Serial No. 246,824.

In describing my invention in detail, reference is had to the accompanying drawing, in which—

Figure 1:
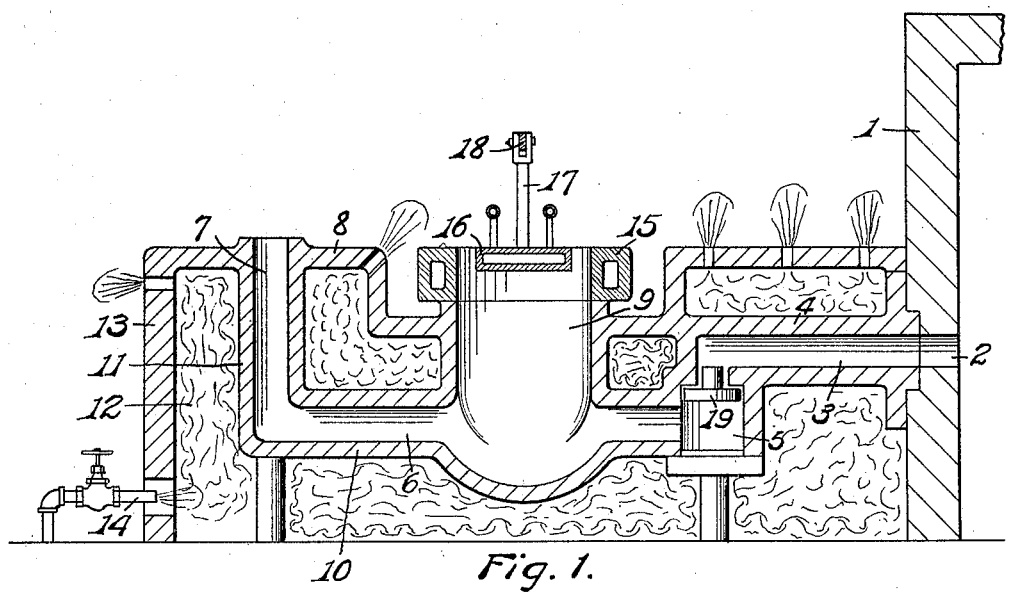
Figure 1 is a longitudinal section of the invention.
Figure 2:
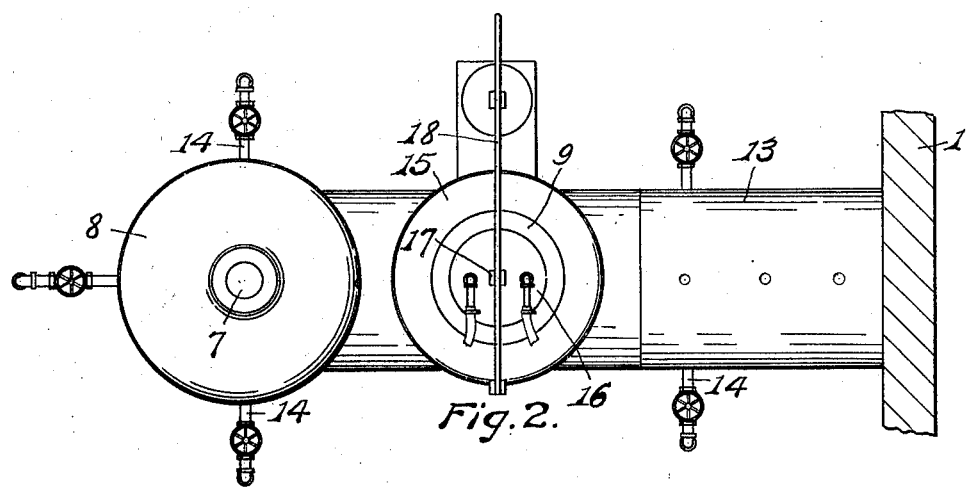
Fig. 2 is a top plan view of the same.

Referring to said drawings, 1 indicates a wall of a glass tank, which has a suitably located port or passage 2 for glass leading outward therethrough. Located in communicating relation to said port 2 is one end of a horizontally disposed passage or duct 3 provided in a suitable conduit 4 which is preferably of tubular form in cross section. The opposite end of said duct opens into the upper end of a valve chamber 5 located at a lower level than said duct so that molten glass passing through the latter will flow by gravity into said chamber. Leading horizontally from said valve chamber in the same general direction as, but at a lower level than, said duct 3 is the tubular end of a second passage 6 which communicates at its opposite end, located a considerable distance from said valve chamber, with the lower end of a vertical well 7 which rises to a suitable height above the normal level of the glass in the glass tank and which has its upper end opening outward through a table-like wall 8 which may constitute a seat for a glass-shaping mold.

Located over the passage 6 at a point intermediate the ends of the latter is an upright cylindrical reservoir 9 having its upper end open and located at a suitable height above the normal level of the glass in the melting tank and having its lower end in open communication with said passage 6.

The conduits 10 and 11 through which lead the passage 6 and well 7, respectively, as well as the conduit 4 and the walls inclosing the valve chamber 5 and the reservoir 9, either are composed of a refractory material or have refractory linings, the same being located within a fire chamber 12 constituted by inclosing walls 13 through which blasts of burning gas are directed from burners or nozzles 14 located at suitable intervals for maintaining the proper degree of fluidity of the glass flowing through said conduits. The reservoir 9, the lower part only of which is located within the fire chamber 12, has a water jacket 15 encircling its upper end whereby the glass at and adjacent to the top of said reservoir may be artificially cooled to a state of semi-solidity to form an elastic diaphragm. Disposed for seating upon said diaphragm is a piston-like plunger 16 which is adapted to be depressed to effect displacement of glass in said reservoir and in the passage 6 whereby the column of glass in the well 7 is actuated to rise for filling a mold (not shown) superimposed upon the table-like wall 8 over the mouth of said well. Said plunger is suitably mounted for actuation, as upon a vertically disposed arm 17 carried by a lever 18 which may be operated by hand or other suitable power.

Disposed within the valve chamber 5 is a vertically movable valve 19 designed to rest, or float, upon the glass within said chamber and to function as a check valve for preventing the return flow of glass from said chamber to the duct 3 when the glass is displaced, as aforesaid, by lowering of the plunger.

It will be noted that the construction which provides for locating the reservoir intermediate the furnace and the well, or in the direct line of flow of the glass from the furnace to the well, possesses marked advantages over the structural arrangement disclosed in my pending application hereinbefore identified, chief among which may be mentioned that the displacing force applied by actuation of the plunger is exerted directly upon the fluid column or mass of glass in the passage 6, providing for a practically continuous movement or flow through said passage when the apparatus is in practical operation.

What is claimed is—

1. Glass delivery apparatus, comprising, in combination with a melting tank, a well located at a suitable distance from said tank, a conduit for conducting glass from said tank to said well, a valve chamber located intermediate the ends of said conduit and separating the latter into two members of which the member adjacent to the tank is disposed on a higher level than the other member, said chamber being adapted to have glass gravitate thereto from the first mentioned member, a reservoir located over and in open communication with that member of the conduit located between the valve chamber and the well, said reservoir having means operable therein for producing glass displacement whereby glass is discharged through the mouth of the well, and a check valve located within said valve chamber whereby the return flow of glass through the entrance passage of said chamber is prevented.

2. Glass delivery apparatus, comprising, in combination with a melting tank, a well located at a suitable distance from said tank, a conduit for conducting glass from said tank to said well, a valve chamber located intermediate the ends of said conduit and separating the latter into two members of which the member adjacent to the tank is disposed on a higher level than the other member, said chamber being adapted to have glass gravitate thereto from the first mentioned member, a reservoir located over and in open communication with that member of the conduit located between the valve chamber and the well, said reservoir having means operable therein for producing glass displacement whereby glass is discharged through the mouth of the well, and a vertically movable float located within said valve chamber and operating as a valve whereby upon actuation of said displacing means the entrance opening of said chamber is automatically closed against a return flow of displaced glass.

3. Glass delivery apparatus, comprising, in combination with a melting tank, a well located at a suitable distance from said tank, a passage for glass leading outward from said tank in the general direction of said well, a second passage located on a lower level than said first passage, said second passage being in open communication with said well and being adapted to receive glass by gravitation from said first passage, and means for producing glass displacement within said second passage for ejecting glass from the mouth of said well.

4. Glass delivery apparatus, comprising, in combination with a melting tank, a well located at a suitable distance from said tank, a passage for glass leading outward from said tank in the general direction of said well, a second passage located on a lower level than said first passage, said second passage being in open communication with said well and being adapted to receive glass by gravitation from said first passage, a reservoir for glass in communication with said second passage intermediate the ends of the latter, and means operable in said reservoir whereby glass in said second passage and said well is displaced for effecting the discharge of glass from the mouth of said well.

In testimony whereof, I affix my signature in presence of two subscribing witnesses.

RICHARD T. McGEE.

Witnesses:
  H. E. DUNLAP,
  A. L. DUNLAP.